UNITED STATES PATENT OFFICE.

ROBERT S. CATES, OF KINGMAN, KANSAS.

CEREAL FOOD.

1,219,809.　　　Specification of Letters Patent.　　Patented Mar. 20, 1917.

No Drawing.　　Application filed February 15, 1916.　Serial No. 78,482.

*To all whom it may concern:*

Be it known that I, ROBERT S. CATES, a citizen of the United States, residing at Kingman, in the county of Kingman and State of Kansas, have invented certain new and useful Improvements in Cereal Foods, of which the following is a specification.

It is the object of this invention to disclose a novel cereal food which will be nourishing and will act as a mild laxative.

Another aim of the invention is to disclose a cereal food so compounded and prepared that the ingredient thereof possessing the properties of a laxative will be disguised as concerns its physical appearance in the food and as regards its taste.

In preparing the food in accordance with the present invention the cereal base is first prepared in the following manner: Any desired cereal grain, such for example as wheat, is first crushed in the same manner as in the ordinary process in the manufacture of wheat flour and the crushed product is screened so as to separate therefrom the bulk of the shorts and the starchy portion of the grain to the extent of about one-fifth of the whole. The grain is then again subjected to a crushing process until it has reached a consistency preferably a grade coarser than ordinary wheat bran. The product thus obtained is placed within an air-tight revolving drum and subjected to a roasting process at about a temperature of 450 degrees F., this roasting operation being carried on until the starchy portion of the product is partly carbonized. In this roasting process the wheat sweat and moisture is removed.

There is next prepared a saline infusion of senna leaves. In preparing this saline infusion one gallon of the infusion is made from twenty-four ounces of senna leaves and to the decanted or filtered liquor there is added as much salt as can be held in solution.

The stated quantity of the saline infusion prepared as above stated is then mixed with sixty pounds of the roasted carbonized cereal product prepared as above described and after thorough mixture the whole is allowed to dry and the product is then ready for use.

Inasmuch as the active principle of the senna leaves is extracted in preparing the infusion and the roasted carbonized cereal product is impregnated with this infusion, there will be no physical evidence of the presence of the senna in the food and its taste will be so disguised by the cereal product that it will not be noticeable.

I employ salt in the preparation for the reason that it improves the taste thereof and also for the reason that having an affinity for moisture, it serves to maintain the food in a fresh condition.

Having thus described the invention, what is claimed as new is:

1. That process of preparing a cereal food which consists in preparing a cereal grain by crushing the grain, then removing a portion of the shorts and starch, then partly carbonizing the remaining starches, and finally impregnating the product with an infusion of a laxative and allowing the whole to dry.

2. That process of preparing a cereal food which consists in preparing a cereal grain by crushing the grain, then removing a portion of the shorts and starch, then partly carbonizing the remaining starches, and finally impregnating the product with a saline infusion of senna leaves and allowing the same to dry.

In testimony whereof, I affix my signature.

ROBERT S. CATES. [L. S.]